(12) United States Patent
Booth et al.

(10) Patent No.: US 8,190,869 B2
(45) Date of Patent: May 29, 2012

(54) DUAL BOOT STRATEGY TO AUTHENTICATE FIRMWARE IN A COMPUTING DEVICE

(75) Inventors: James R. Booth, Nicholasville, KY (US); John F. Gostomski, Lexington, KY (US); Mike Partington, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1359 days.

(21) Appl. No.: 11/787,545

(22) Filed: Apr. 17, 2007

(65) Prior Publication Data

US 2008/0263345 A1 Oct. 23, 2008

(51) Int. Cl.
*G06F 21/00* (2006.01)
(52) U.S. Cl. .......... 713/2; 713/194; 726/26; 726/34
(58) Field of Classification Search .......... 713/1, 2, 713/185, 192, 194; 726/2, 26, 34, 35
See application file for complete search history.

(56) References Cited

U.S. PATENT DOCUMENTS

| | | | | |
|---|---|---|---|---|
| 6,038,667 | A * | 3/2000 | Helbig, Sr. .......... | 726/16 |
| 6,170,082 | B1 * | 1/2001 | Demaray et al. .......... | 717/127 |
| 6,711,675 | B1 * | 3/2004 | Spiegel et al. .......... | 713/2 |
| 6,892,305 | B1 * | 5/2005 | Dayan et al. .......... | 713/192 |
| 6,928,548 | B1 * | 8/2005 | Hale et al. .......... | 713/187 |
| 6,976,167 | B2 * | 12/2005 | Nenashev .......... | 713/168 |
| 7,526,812 | B2 * | 4/2009 | DeYoung .......... | 726/26 |
| 2004/0128673 | A1 * | 7/2004 | Fuchs et al. .......... | 719/310 |
| 2006/0179302 | A1 * | 8/2006 | Hatakeyama .......... | 713/164 |
| 2007/0088613 | A1 * | 4/2007 | Adkins et al. .......... | 705/21 |
| 2007/0130452 | A1 * | 6/2007 | Muir .......... | 713/1 |
| 2008/0086629 | A1 * | 4/2008 | Dellow .......... | 713/2 |
| 2008/0250406 | A1 * | 10/2008 | Carpenter et al. .......... | 718/1 |

OTHER PUBLICATIONS

Snooke et al. "Hierarchical functional reasoning" Department of Computer Science, University of Wales, Aberystwyth, Ceredigion, SY23 3DB, UK, Received Jul. 16, 1998; accepted Jul. 24, 1998. Elsevier Science, Knowledge-Based Systems, vol. 11, Issues 5-6, Nov. 23, 1998, pp. 301-309.*

* cited by examiner

*Primary Examiner* — Hadi Armouche

(57) ABSTRACT

Methods for authenticating firmware in a computing device include partitioning functions critical to the intended role of the computing device so that, upon successful authentication of the firmware, all functions of the device are made operational. Otherwise, the computing device behaves in a diagnostic mode of operation to assist users in troubleshooting to eventually authenticate firmware. At least first and second sets of firmware are loaded at various times into a controller of the computing device with the first set occurring without verification of trustworthiness, while the second set occurs upon authentication of the first. The second is used to authenticate a remainder set of firmware. Particular computing devices contemplate laser printers, mobile phones, PDA's, gaming consoles, etc. Firmware downloads, error messaging, hash comparisons, signature table construction, page-in techniques, computer program products, and particular computing arrangements are other noteworthy features, to name a few.

18 Claims, 7 Drawing Sheets

DUAL BOOT STRATEGY TO AUTHENTICATE FIRMWARE IN A COMPUTING DEVICE

FIELD OF THE INVENTION

The present invention relates to computing devices, such as laser printers, cell phones, PDA's, gaming consoles, Set-Top Boxes, etc. In particular, it relates to computing devices with processors needing installed firmware, especially those subject to tampering or unauthorized modifications. In preferred aspects, processing contemplates first and second boot sections of firmware with the first occurring unbeknownst to its trustworthiness. The second boot occurs upon authentication of the first boot. Various features relate to using the computing device in a diagnostic mode of operation, despite firmware being unauthenticated or flagged as tampered-with so users can troubleshoot their devices in order to make them fully operational. Downloads, hash comparisons, signature table construction, page-in techniques, computer program products, and particular computing arrangements are other noteworthy features, to name a few.

BACKGROUND OF THE INVENTION

It is crucial to many products using firmware in a controller or processor to assure its authenticity to provide reliable and consistent device functioning in a tamper-resistant manner. While numerous security protocols exist in the public domain for securing data transmissions, none exist for embedded computer systems having limited hardware support, in turn, driven by low-cost targets. In other words, modern controllers (whether wholly integrated in ASIC form or spread amongst numerous chips on a circuit board, for example) are engineered to be more inexpensive with each generation. For example, sophisticated controllers with on-board or integral read-only memories (ROMs), where firmware is often stored, are now being made with field-programmable, non-volatile memories to increase flexibility and allow upgrade of the device after it is sold. This, however, comes at the cost of having assuredly authentic firmware that must come from another source, such as from a download external to the device or from non-integral, non-volatile memory subject to tampering attacks. Also, many computing devices upon learning of untrustworthy firmware render inoperative the entire functionality of the computing device thereby leaving users with a device unable to perform in the role for which it was purchased.

To the extent an embedded system includes numerous input/output ports or varied memory configurations, especially an embedded system using a demand paging operating system to minimize random access memory (RAM) requirements, making sure that a set of firmware that was earlier signed or verified is still the set of code executing, is especially troubling. Making sure that an alternate set of firmware has not been substituted between the time when the authentic firmware is verified and when the code is "paged in" presents numerous issues.

Accordingly, a need exists in the art of computing devices with embedded systems, such as laser printers, to be able to authenticate controller firmware despite engineering and financial constraints forcing limited hardware support. The need further contemplates assisting users in troubleshooting their devices, despite firmware being recognized as untrustworthy and to ensure ongoing authentication exists for times after initial authentication. In this manner, users can have fully operational and authenticated devices at all times. Naturally, any improvements along such lines should further contemplate good engineering practices, such as relative inexpensiveness, stability, ease of implementation, low complexity, security, unobtrusiveness, etc.

SUMMARY OF THE INVENTION

The above-mentioned and other problems become solved by applying the principles and teachings associated with the hereinafter described dual boot strategy to authenticate firmware in a computing device, such as laser printers. In general, functions critical to the intended role of the computing device (such as printing hard copy outputs with a laser printer) are partitioned so that, upon successful authentication of the firmware, all functions of the device are made operational. Otherwise, the computing device behaves in a diagnostic mode of operation only to assist users in troubleshooting their devices.

In various embodiments, at least first and second sets of firmware are loaded at various times into a controller of the computing device. The first set is loaded, however, without any verification of its trustworthiness, while the second set is loaded only upon authentication of the first. The second set is then used to verify a remainder set. At a high level, this approach is a "trust propagation" technique, where a trusted set of firmware attests to the authenticity of another set of firmware through a signature or other veracity chain.

In a particularly disclosed embodiment, one algorithm begins with hardware power-on-reset, where firmware to-be-executed is read from non-volatile memory. Given the complexities of a product's manufacturing process, it is desirable for this firmware to come from non-volatile memory that is either present in the product itself (native) or from an external agent. In the latter, this recognizes manufacturing processes having native firmware that has not yet been programmed into the product's native non-volatile memory. However, the dilemma from a firmware authenticity viewpoint is that if boot code is first provided by an external source, the beginning of the required "chain of trust" starts from a source that cannot be trusted. To counteract this condition, the embedded computer system powers-up in a limited functional mode of operation only. In this mode, basic computer resources like memory and limited input/output are available, but the hardware needed to perform the customer function of the product is blocked. Examples of these "blocked" functions would be the radio in a cell phone, the touch screen of a PDA or the video interface of a laser printer all being rendered inoperative. On the other hand, the product or computing device is fully operational in its diagnostic mode of operation so users can troubleshoot the problems of their device.

Upon booting into the "un-trusted" state, the next step in the algorithm initializes a RAM controller and copies authentic "second boot" firmware from non-volatile memory to RAM. The "first boot" firmware then commands the hardware to perform a "second boot" where the microprocessor or other controller is reset (including discarding any and all latent state stored in the processor core or caches). Before the embedded processor is released from reset, however, the embedded system hardware measures the second boot firmware in RAM, by way of a cryptographic hash or similar technique, and compares this measurement to the correct value obtained from a trusted source. This trusted source would typically be a tamper resistant memory device that serves as the embedded system's "root of trust." To the extent the hardware comparison of the measurements shows that the "second boot" firmware is authentic, the hardware enables the full function of the embedded system and releases the processor from reset. If the "second boot" firmware measurement does not match, the embedded system remains in its "un-trusted" function state and the processor is released from reset to inform the user and/or to attempt to recover from an incorrect manufacturing process.

Also, authentic second boot firmware proceeds to test the complete system for correct hardware operation (power-on-self-test, for instance) and to verify the remainder of the system's firmware as authentic. This verification can use any number of well known signature methods. As the remainder of the firmware is verified, a set of measurements, one measurement for each potentially page-able unit of memory, are made and stored in a table. If the entire functional firmware load is validated, then the second boot code passes control of the processor to this verified and measured functional firmware. An important aspect of this contemplates that whenever a portion of the firmware is "paged in" from non-volatile memory, the page must be re-measured and the measurement checked against the table of measurements saved when the firmware was validated as authentic. In turn, this assures that if non-authentic firmware was substituted in the meanwhile, the measurement will not match and the substitution will be detected. It provides a continuous validation that the embedded system will only execute what it verified.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, a dual boot strategy to authenticate firmware in a computing device is hereinafter described.

Figure 1:
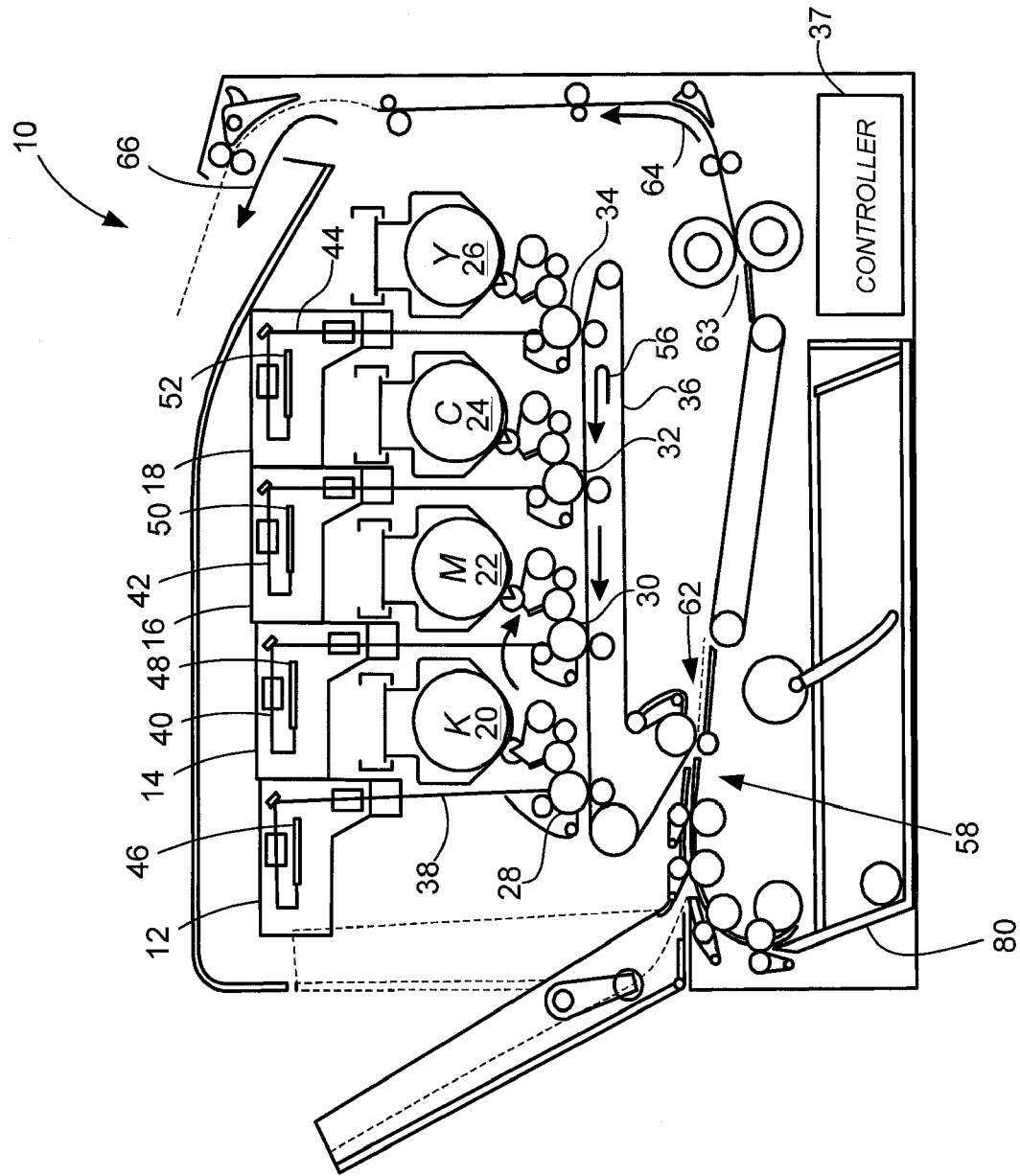
FIG. 1 is a diagrammatic view in accordance with the teachings of the present invention of a computing device in the form of a laser printer having an embedded computer system utilizing a dual boot strategy.

With reference to FIG. 1, a representative computing device with dual boot strategy for authenticating firmware is typified by a laser printer indicated generally by the numeral 10. The computing device includes a plurality of optionally removable toner cartridges 20, 22, 24 and 26 that have different colored toner (C, M, Y, K) therein, an intermediate transfer member (belt 36), laser print heads 12, 14, 16 and 18 and one or more recording media supply trays 80. During use, each of laser print heads projects a respective laser beam 38, 40, 42, 44 from a respective laser source 46, 48, 50 and 52. As a polygon mirror, oscillator or other scanner mechanism moves, it scans a respective one of reflected laser beams across a respective one of photoconductive drums 28, 30, 32 and 34 to create a latent to-be-printed image. The image data is received from a controller 37, in turn, supplied from an external computing device (not shown), such as a special or general purpose computer, cell phone, PDA, scanner, memory card, camera, etc.

To develop the images, toner in each of the cartridges is transferred to the photoconductive drums by appropriately biased voltages and then transferred to a media (hard copy output) or an intermediate transfer member and then to the media. In this case, toner from cartridges 20, 22, 24 and 26 is brought into contact with a respective one of photoconductive drums 28, 30, 32 and 34 which, in turn, is transferred to a belt 36 rotating in the direction indicated by arrow 56. As a print medium, such as paper, travels along path 58 from tray 80, the toner is transferred to the surface of the print medium in a nip 62. Thereafter, the media is advanced in the direction of arrows 64, 66 (and fused along the way at nip 63) to provide an output hard-copy to users.

As will be described in more detail hereafter, the controller 37 is that portion of the computing device in need of authenticated firmware. It also may be an Application Specific Integrated Circuit (ASIC), microprocessor, a collection of dedicated electronic chips, such as on a printed circuit board (PCB), or other type of controller able to use a dual boot strategy. It may even be a collection of the foregoing.

Figure 2:
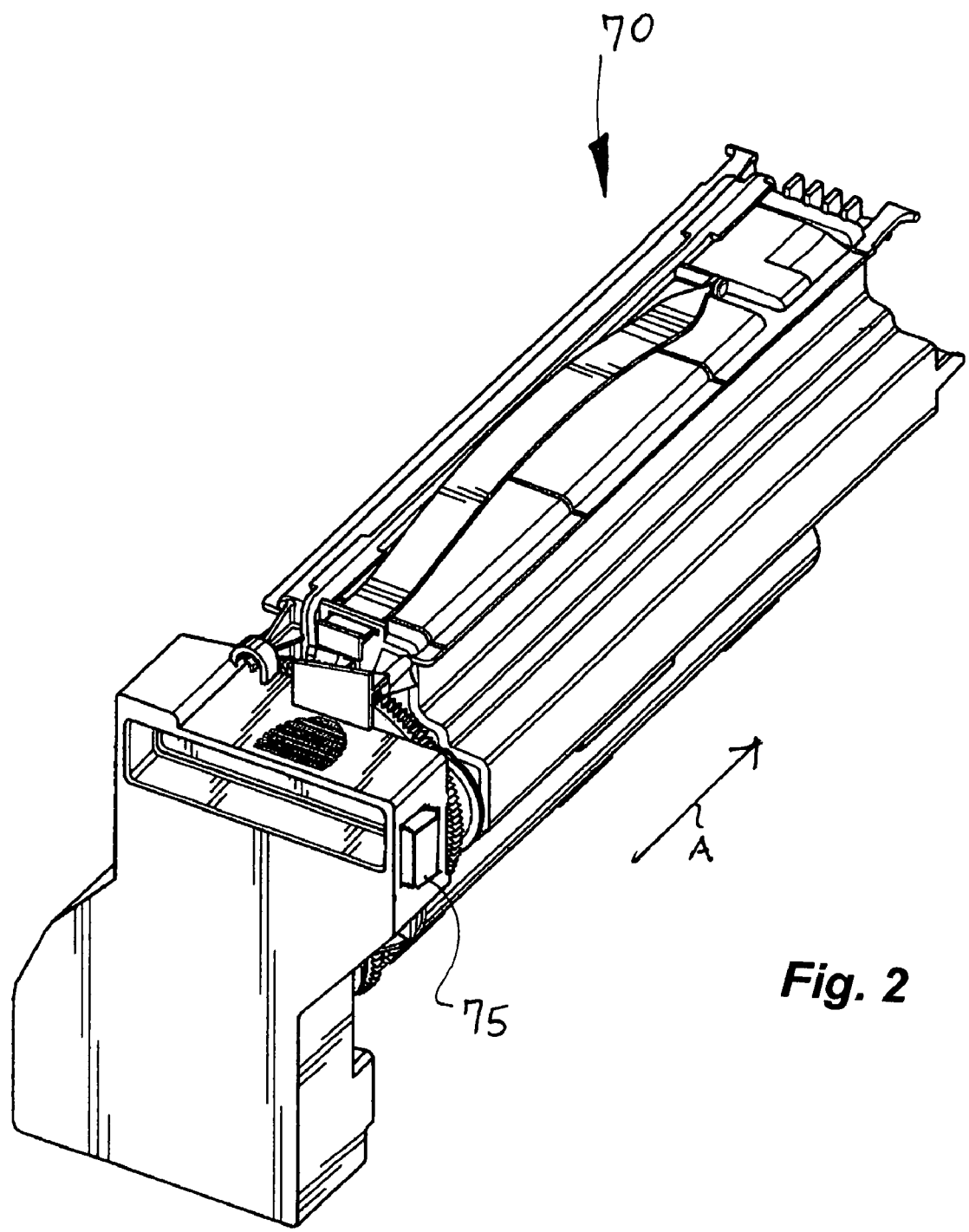
FIG. 2 is a diagrammatic view in accordance with the teachings of the present invention of a supply item for use with the computing device of FIG. 1.

With reference to FIG. 2, a generic toner cartridge for inclusion in the computing device of FIG. 1 is seen generally as 70. It has a longitudinal extent and slides transversely into the computing device in a direction of Arrow A. Further, it includes a smart chip or other memory device 75 useful in storing various data, such as is relevant to printing, like an amount of toner remaining in the cartridge, or that is relevant to the cartridge, like a cartridge serial number, age of the cartridge, etc. During use, it communicates with the controller 37 (FIG. 1) to effectuate printing, as is well known.

Figure 3:
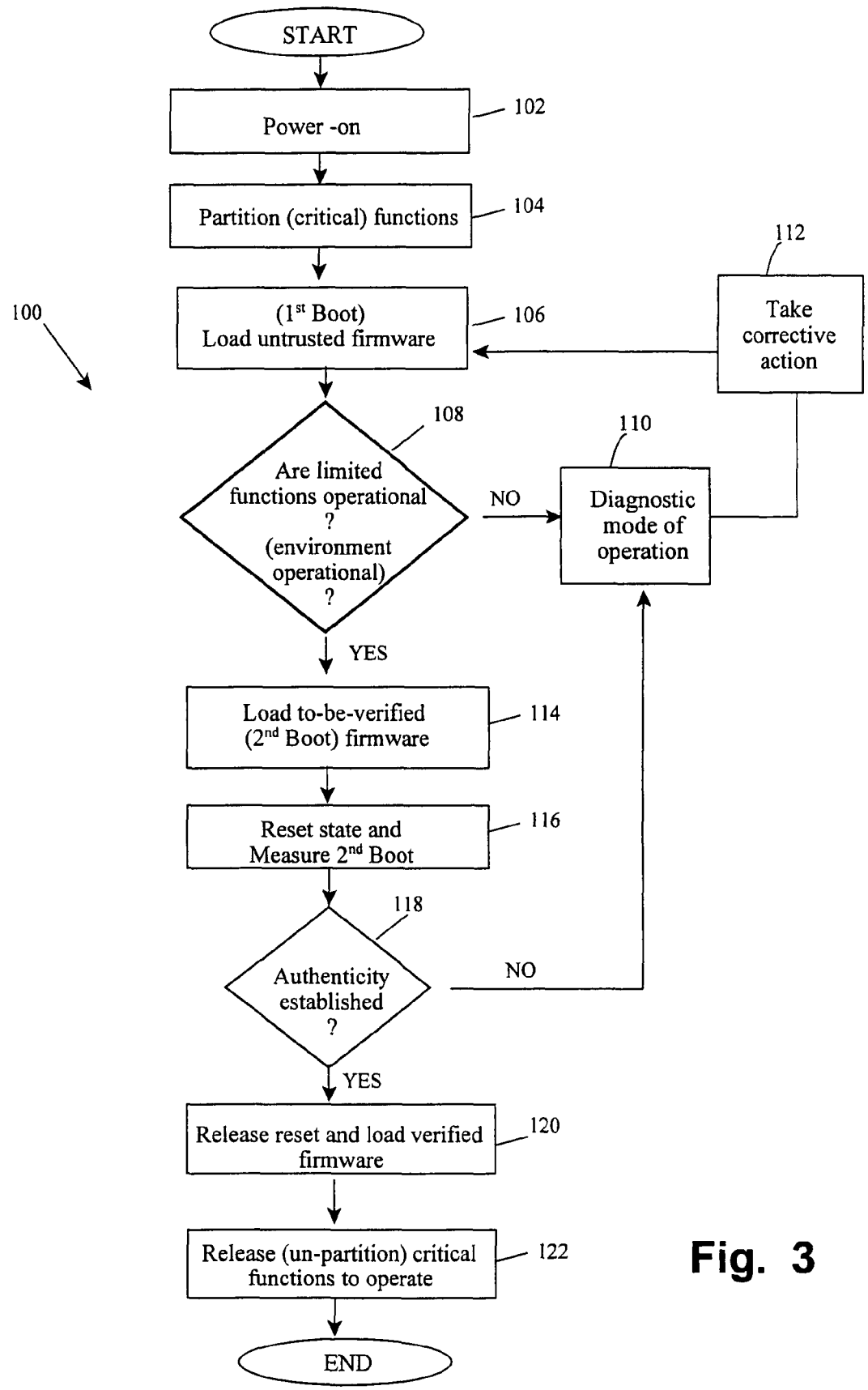
FIGS. 3 and 4 are flow charts in accordance with the teachings of the present invention indicating a dual boot strategy for a computing device, such as the laser printer of FIG. 1.

In FIG. 3, a high level organization for a dual boot strategy to authenticate firmware in a computing device is given generally as 100. In general, the flow is that of a "trust propagation" technique, where a trusted set of firmware attests to the authenticity of another set of firmware through a signature chain, to ultimately ensure the firmware of the computing device is authentic or un-tampered. Also, the diagrammatic views of FIGS. 5A-5G will be used to sequentially show (and co-reference) the steps of the organization 100 at the component level in a computing device in the form of a laser printer. Namely, a laser printer 10 includes a controller 37 having access to at least a non-volatile (NV) memory 200 and a RAM 202 (e.g., DRAM). In turn, the non-volatile memory has first and second boot sections of firmware 204, 206 and a third set of executable instructions labeled remainder firmware 208, that will be attested to in order as a trust propagation technique.

Turning back to FIG. 3, step 102 begins the disclosed algorithm as the hardware of the computing device powers-on. Alternatively, it begins upon a step of resetting, re-booting, etc., or at some other time convenient to break or interrupt a primary role undertaken by the computing device. For instance, a computing device in the form of a laser printer has a primary role of providing hard copy output images to users. A break or interruption in this role could equate to a user activity of opening a door of the printer to clear a paper jam. In a computing device in the form of a gaming console, a break or interruption in the playing of video games could occur upon a user removing a previously played game and inserting a second, to-be-played game. Alternatively still, the algorithm could begin upon periodic or random intervals selected by the user, the controller or both. Of course, skilled artisans can contemplate other situations in which to begin the algorithm of the invention.

Regardless, step 104 contemplates that whatever the primary role of the computing device typifies, functions critical to operation of the computing device will be partitioned from those not critical. In other words, the computing device is caused to operate in a limited-function mode only and its primary or intended purpose/role is prevented or substantially inhibited. Diagrammatically in FIG. 5B, this is seen as the controller 37 partitioning critical functions CF 210. In the case of the laser printer, various laser scanning operations, motors to pick and advance paper to print, or the like, are inhibited from operation and so the printer cannot make hard copy outputs. Stated differently, the functions of the controller 37 that cause image data to scan latent images or operate motors, is "partitioned" from working. The controller itself, however, is otherwise working and fully operational, but the computing device entirety is not, such as by having certain functionality "blocked." In examples of other computing devices, blocked functions include the radio in a cell phone being inoperative, the touch screen of a PDA being inoperative, the scanning of a scanner being inoperative, or the playing of games in a gaming console being inoperative. Naturally, skilled artisans are readily able to conjure up other scenarios.

At step 106, the first boot of firmware into the controller occurs and such is seen in FIG. 3. In the representative embodiment of FIG. 5C, the first boot firmware resides fairly permanently in local or remote NV memory 200 and upon powering-on, reset, etc., (step 102) the executable instructions are pulled or pushed (Arrow B) into the controller 37 (although shown as no longer in the NV memory, the first boot firmware still resides there fairly permanently to be used whenever needed). In this way, the controller itself need not have a dedicated memory onboard (e.g., ROM) and costs can be saved by making or utilizing a controller chip without memory. The downside, however, is that the firmware from a location external the controller (e.g., non-volatile memory) is not verified as authentic or trustworthy. In turn, a dilemma exists in that a "chain of trust" first begins with a source that itself is not trusted.

To counter this, step 108 provides that only limited functions of the computing device are tested or analyzed to determine if they are operational or otherwise behaving satisfactorily. In the laser printer example, for instance, it is determined whether the PCB is healthy, whether all wiring/solder connections are working to send signals, whether communication ports are operating properly, etc. Other memory, such as the RAM, is tested to see if it too is working to communicate with other devices. Naturally, operational functions are somewhat dictated by the type of computing device in which they are employed and skilled artisans can contemplate other limited-mode functional tests for a laser printer or other computing device to see if the environment itself works as expected.

In the event the limited functions are not operational or act unsatisfactorily, the computing device behaves in a diagnostic mode of operation only at step 110. Also, the critical functions (partitioned at step 104) remain partitioned or inoperative. In this manner, users can take advantage of the computing power of the controller to help solve problems of the firmware, but without having the primary role of the computing device at their disposal. In other words, a failed operational test at step 108 only indicates that the environment of the computing device is compromised, but this should not otherwise limit users from being able to fix their computing device so that it can be made operational in the future. In contrast, computing devices of the past (with failed operational tests) rendered the computing device wholly inoperative and left it unusable until fixed in a manner other than with user-assistance of the controller. In this invention, however, the controller indeed remains operational in the diagnostic mode to assist in fixing the device. Thence, at step 112, a corrective action is taken to fix the computing device. Since many computing devices are directly or indirectly connected to other computing devices, including or not the internet, downloading of new set of first boot firmware could occur to replace the first boot version of firmware tested as bad. Alternatively, corrective action could exist in the form of error messages being sent to users and other computing devices. Also, menus of options or troubleshooting techniques could be offered to users to help diagnose the problem. Once this is tried, regardless of form, the process repeats by again loading the first boot of firmware into the controller, step 106. A test of the limited-functions occurs and, if failed, repeats until the user tires of the troubleshooting or diagnostic mode of operation or until the determination at step 108 passes.

If passed, step 114 contemplates the resetting of the controller and loading the second boot firmware for verification. In the laser printer embodiment of FIG. 5D, this includes initializing the RAM 202 and the first boot firmware and copying the second boot firmware 206 from the NV memory 200 to the RAM. The resetting includes discarding any and all latent state information stored in the processor core or caches of the controller. At is seen, this means the controller of the computing device is no longer executing the first boot firmware and a separate memory, the RAM, is where the second boot firmware resides for verification.

Figure 5A:
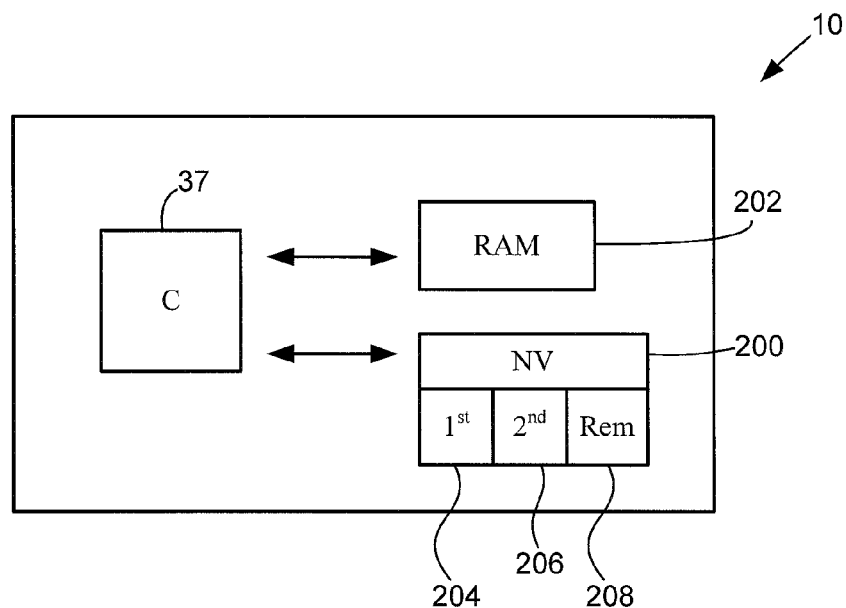
FIGS. 5A-5G are diagrammatic views in accordance with the teachings of the present invention of the interaction of a controller and various memories of the computing device of FIG. 1 during the dual boot strategy.
Figure 5B:
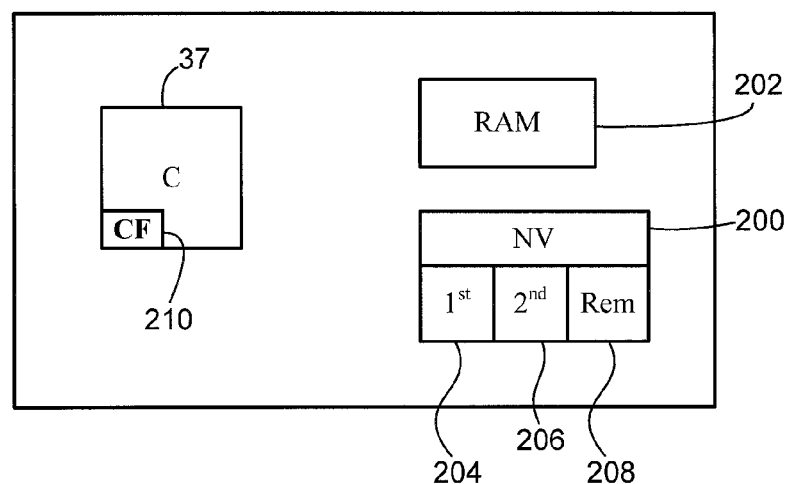
Figure 5C:
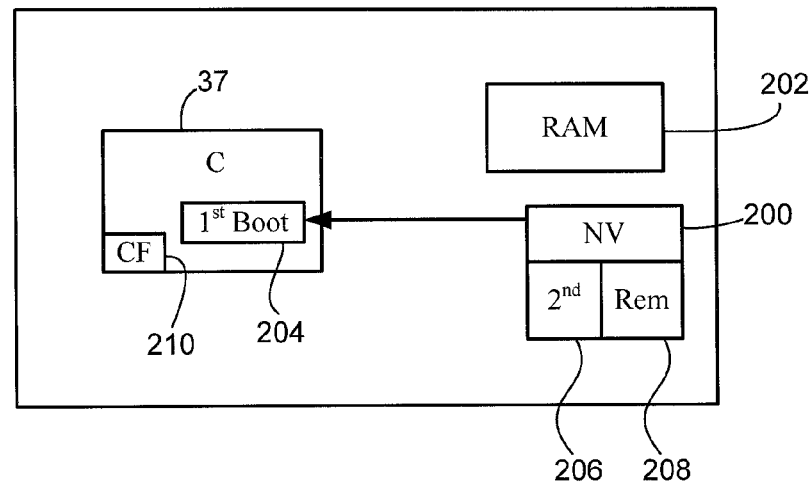
Figure 5D:
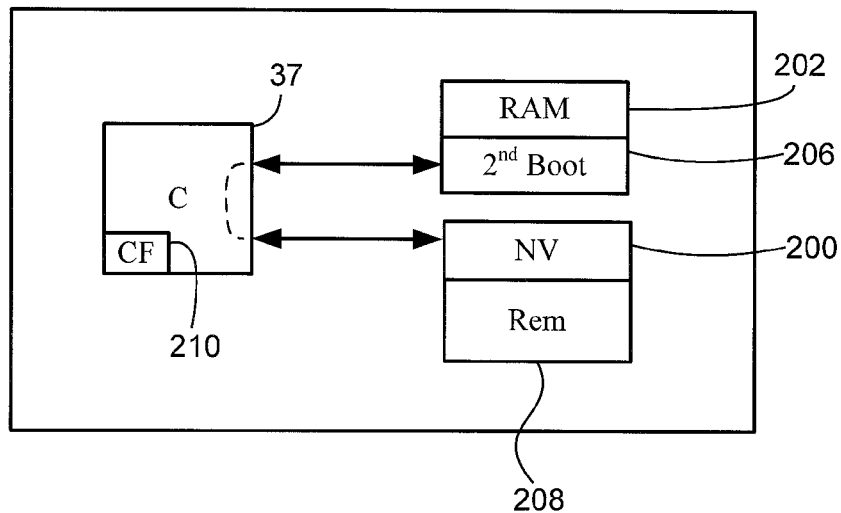
Figure 5E:
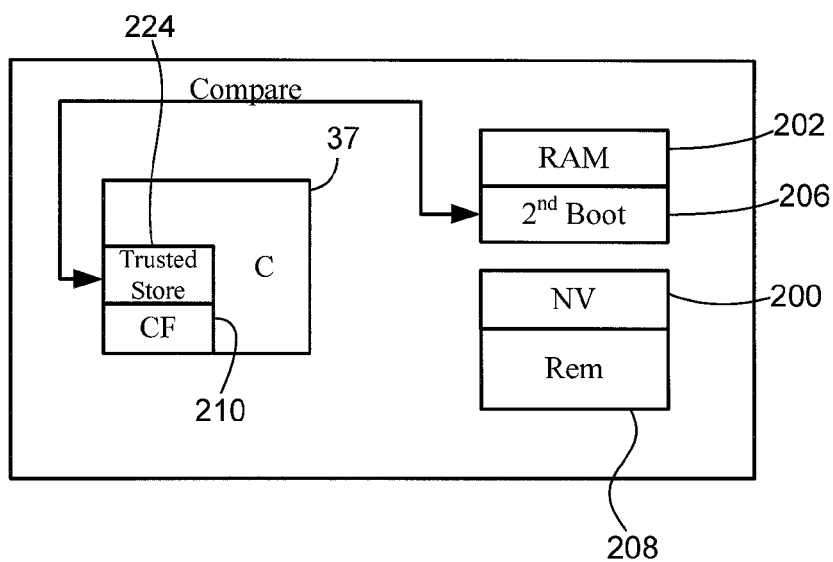
Figure 5F:
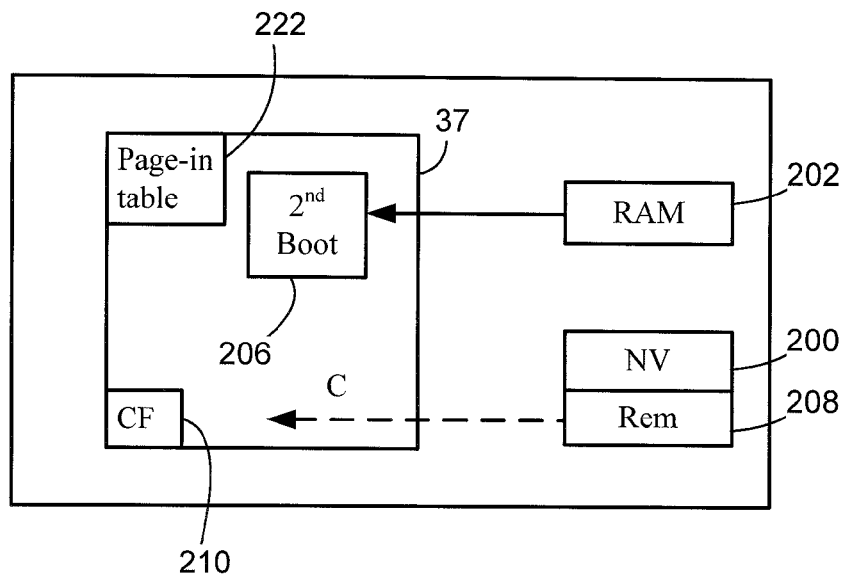
Figure 5G:
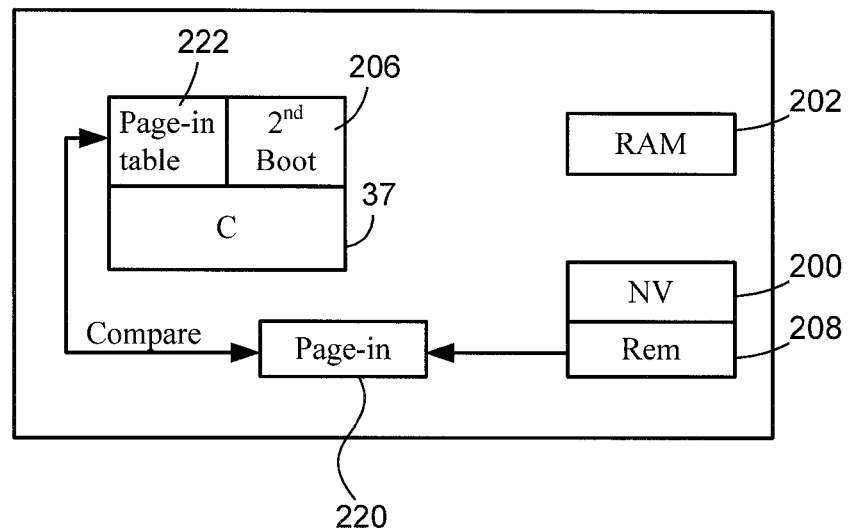

At step 116, the embedded system hardware measures, by way of a cryptographic hash or similar technique, the second boot firmware in the RAM and compares this measurement to a correct value obtained from a trusted source, step 118. In FIG. 5E, this is seen as the comparison of the trusted store 220 of the controller against the second boot firmware 206 of the RAM 202. This trusted source would typically be a tamper resistant memory device as part and parcel of the controller (or another chip) that serves as the embedded system's "root of trust." In alternate embodiments, however, this trusted store could be received from a location external the controller 37 and, perhaps, external to the computing device itself.

In either event, if the comparison of firmware does not reveal a match, or establish an appropriate level of authenticity, the diagnostic mode of operation for the computing device remains firmly in place at step 110, as before. If, on the hand, the comparison shows that the second boot firmware is sufficiently authentic, the hardware of the computing device enables the reset of the controller to accept the second boot firmware (and other firmware as necessary), step 120. Function the computing device in its primary role then occurs by releasing the partitioned critical functions so they may operate as intended, step 122.

Figure 4:
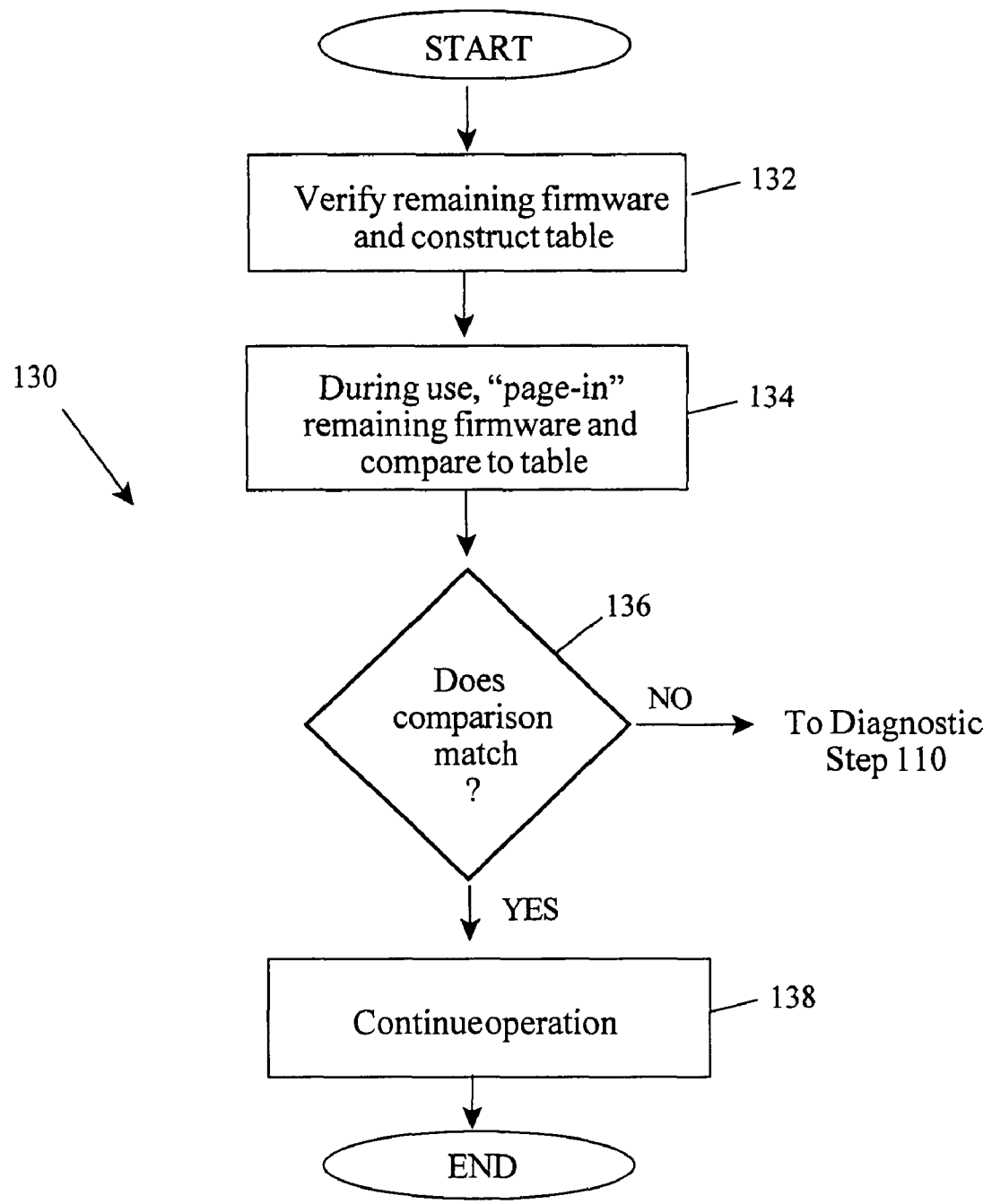

In a further embodiment of the invention, reference is taken to the flow chart 130 of FIG. 4. In this embodiment, the now authenticated second boot firmware of the controller 37 proceeds to test the complete system for correct hardware operation (e.g., power-on self-test) and to verify the remainder of the system's firmware as authentic (e.g., the remainder firmware 208, FIG. 5F). In this regard, the verification uses any number of well known signature methods and a table is constructed per "page-able" units of memory per the remainder firmware, step 132. In other words, each page-size memory unit of the remainder firmware 208 is read by the controller (according to the second boot firmware) and a signature entered per page. During use, as the remainder firmware is needed for operation, it is "paged-in" 220 and compared to the value stored in the table 222 (and also step 134). If it is the same as that earlier recorded, a comparison of signatures reveals a match (step 136) and operation of the computing device continues as normal with critical functions being operational (and also step 138). If, on the other hand, the comparison does not match, the diagnostic mode of operation is entered, step 110. Stated differently, if the entire functional firmware load is validated, then the second boot firmware passes control of the processor to this verified and measured functional firmware for full operation. As skilled artisans will then appreciate, whenever a portion of this remainder firmware is "paged in" from non-volatile memory, the page is re-measured and the measurement checked against the table of measurements that was saved when the firmware was earlier validated as authentic. In turn, this technique assures that if non-authentic firmware is substituted between the time of table construction, for example, and the time of page-in of the remainder firmware, the measurement will not match and the substitution will be detected. As a result, the invention provides a continuous validation technique that makes sure the embedded system only executes what it earlier verified.

Certain advantages of the invention over the prior art should now be readily apparent. For example, a major characteristic of the foregoing algorithm is that of assuring only authentic firmware is executed on an embedded system. Also: 1) the embedded system initial boot is limited in function since it is required to execute firmware from an external source in order to program its native non-volatile memories. In turn, the limited function protects the overall system function from non-authentic firmware in that the hardware blocks important functionality until it can verify an authentic second boot set of firmware; 2) the transition from the un-trusted first boot of firmware to a trusted second boot of firmware involves the clearing of all residual state(s), hardware measuring the second boot firmware and verifying the measurement against a value obtained from a trusted source; 3) the verified second boot firmware verifies the remainder 208 of the firmware load, making measurements of all page-able units and saving these measurements in a table; and 4) as firmware is paged-in from non-volatile memory, it is measured and the measurement compared to the one made when the firmware was originally verified.

One of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures. The present invention is not limited except as by the appended claims.

What is claimed:

1. A method for authenticating firmware in a computing device, comprising:
   partitioning functions of the computing device into operative and inoperative states;
   loading a first set of firmware code into a controller of the computing device, said first set of firmware code being unverified as trustworthy;
   determining whether said functions of the computing device partitioned as operative are performing as expected;
   if said functions are not performing as expected, operating the computing device in a diagnostic mode of operation only thereby leaving inoperative the functions partitioned as inoperative; and
   if said functions are performing as expected, verifying a second set of firmware code as being un-tampered,
   wherein said verifying said second set of firmware code as being un-tampered further includes creating a comparison table and during use with a page-in operation of the computing device comparing a third set of executable code to said comparison table.

2. The method of claim 1, further including loading said second set of firmware code into the controller.

3. The method of claim 2, further including making operative said functions partitioned as inoperative.

4. The method of claim 1, wherein said verifying said second set of firmware code as being un-tampered further includes comparing a first hash value corresponding to said second set of firmware code to a second hash value generated by the controller or supplied to the controller from a trusted source.

5. The method of claim 4, further including operating the computing device in said diagnostic mode of operation only thereby leaving inoperative the functions partitioned as inoperative if said first and second hash values do not match.

6. A method for authenticating firmware in a computing device having various functions, some of said functions being critical to operating the computing device in an intended role, comprising:
   rendering inoperative at least one of said some of said functions thereby rendering said computing device inoperative from said intended role;
   loading a first set of firmware code into a controller of the computing device, said first set of firmware code being unverified as trustworthy;
   operating the computing device in a diagnostic mode of operation only upon determining at least one of said functions not being critical to said operating the computing device in said intended role is performing unexpectedly, said diagnostic mode of operation allowing the controller to remain operational to assist in fixing the computing device;
   verifying a second set of firmware code as being un-tampered if said at least one of said functions not being critical performs as expected, comprising comparing, during a page-in operation of the computing device, a third set of firmware code against a measurement corresponding to the third set of firmware code previously validated as authentic.

7. The method of claim 6, further including operating the computing device in said diagnostic mode of operation if a second set of firmware code for loading into said controller cannot be verified as authentic.

8. The method of claim 6, further including making operative said some of said functions rendered inoperative upon said at least one of said functions not being critical to said operating the computing device in said intended role is performing expectedly and if a second set of firmware code for loading into said controller can be verified as authentic.

9. The method of claim 6, further including taking corrective action so that said at least one of said functions not being critical to said operating the computing device in said intended role performs expectedly, comprising sending error messages to one of a user and another computing device.

10. The method of claim 9, wherein said taking corrective action further includes downloading a third set of firmware code for loading into said controller to replace or supplement said first set of firmware code.

11. A method for authenticating firmware in an electrophotographic device having a controller, a non-volatile memory and a random access memory and said controller being operative to communicate with a memory chip of a toner cartridge for rendering hard copy outputs, comprising:
   storing first and second sets of firmware code in said non-volatile memory;
   rendering inoperative a function critical to operating the electrophotographic device in providing said hard copy outputs;
   loading said first set of firmware code into said controller from said non-volatile memory, said first set of firmware code being unverified as trustworthy;
   determining whether a limited set of functions of the electrophotographic device are performing satisfactorily;
   if said limited set of functions are performing satisfactorily, loading said second set of firmware code into said random access memory from said non-volatile memory;
   verifying an authenticity of said second set of firmware code;
   if said authenticity of said second set of firmware code is verified, loading said second set of firmware code into said controller;
   rendering operative said rendered inoperative function critical to operating the electrophotographic device in order to provide said hard copy outputs; and
   operating the electrophotographic device in a diagnostic mode of operation only thereby preventing said hard copy outputs if said authenticity of said second set of firmware code cannot be verified or if said limited set of functions are not performing satisfactorily,
   wherein said verifying said authenticity of second set of firmware code further includes creating a comparison table and during use with a page-in operation of firmware code from the non-volatile memory to the controller comparing a third set of firmware code to said comparison table.

12. The method of claim 11, further including downloading a third set of firmware code for loading into said controller to replace or supplement said first or second set of firmware code.

13. The method of claim 11, wherein said verifying said authenticity of said second set of firmware code further includes comparing a first hash value corresponding to said second set of firmware code to a second hash value generated by the controller or supplied to the controller from a trusted source.

14. The method of claim 11, wherein said rendering inoperative said function critical to operating the electrophotographic device in providing said hard copy outputs further includes preventing operation of said controller from controlling a laser or a motor of the electrophotographic device.

15. A method for authenticating firmware in an electrophotographic device having various functions, some of said functions being critical to providing hard copy outputs during use, comprising:
   storing first and second sets of firmware code for use in a controller of said electrophotographic device;
   partitioning said functions of the electrophotographic device into operative and inoperative states, said some of said functions being critical to providing hard copy outputs during use being in said inoperative state;
   loading said first set of firmware code into said controller, said first set of firmware code being unverified as trustworthy;
   determining whether said functions of the electrophotographic device partitioned as operative are performing as expected;
   if said functions are not performing as expected, operating the computing device in a diagnostic mode of operation only thereby leaving inoperative the functions partitioned as inoperative, said diagnostic mode of operation allowing the controller to remain operational to assist in fixing the computing device; and
   if said functions are performing as expected, verifying said second set of firmware code as being authentic, comprising comparing, during a page-in operation of the electrophotographic device, a third set of firmware code against a measurement corresponding to the firmware previously validated as authentic.

16. The method of claim 15, if said functions are performing as expected, making operative said some of said functions partitioned as inoperative.

17. The method of claim 6, wherein the measurement comprises a comparison table.

18. The method of claim 15, wherein the measurement comprises a comparison table.

* * * * *